United States Patent
Kim et al.

(10) Patent No.: US 9,595,392 B2
(45) Date of Patent: Mar. 14, 2017

(54) MULTILAYER CERAMIC CONDENSER AND METHOD OF MANUFACTURING THE SAME

(71) Applicant: SAMSUNG ELECTRO-MECHANICS CO., LTD., Suwon-si, Gyeonggi-do (KR)

(72) Inventors: Hyung Joon Kim, Hwaseong-si (KR); Jong Hoon Kim, Hwaseong-si (KR); Kang Heon Hur, Seongnam-si (KR); Dae Bok Oh, Seoul (KR)

(73) Assignee: SAMSUNG ELECTRO-MECHANICS CO., LTD., Suwon-si, Gyunggi-do (KR)

( * ) Notice: Subject to any disclaimer, the term of this patent is extended or adjusted under 35 U.S.C. 154(b) by 6 days.

(21) Appl. No.: 14/847,826

(22) Filed: Sep. 8, 2015

(65) Prior Publication Data
US 2015/0380166 A1    Dec. 31, 2015

Related U.S. Application Data

(62) Division of application No. 13/191,849, filed on Jul. 27, 2011, now Pat. No. 9,159,494.

(30) Foreign Application Priority Data

Dec. 13, 2010    (KR) .......................... 10-2010-0126974

(51) Int. Cl.
*H01G 4/30* (2006.01)
*H01G 4/12* (2006.01)
(Continued)

(52) U.S. Cl.
CPC ............. *H01G 4/30* (2013.01); *H01G 4/0085* (2013.01); *H01G 4/012* (2013.01); *H01G 4/12* (2013.01);
(Continued)

(58) Field of Classification Search
None
See application file for complete search history.

(56) References Cited

U.S. PATENT DOCUMENTS 5,072,329 A    12/1991    Galvagni
5,597,494 A    1/1997    Kohno et al.
(Continued)

FOREIGN PATENT DOCUMENTS

JP    3-108306 A    5/1991
JP    10-50545 A    2/1998
(Continued)

OTHER PUBLICATIONS

Office Action issued in Japanese Patent Application No. 2011-164053 dated Feb. 5, 2013.
(Continued)

*Primary Examiner* — Dion R Ferguson
(74) *Attorney, Agent, or Firm* — McDermott Will & Emery LLP (57) ABSTRACT

Disclosed are a multilayer ceramic condenser and a method of manufacturing the same. The method includes printing a plurality of stripe-type inner electrode patterns in parallel on ceramic green sheets; forming a laminate by staking the ceramic green sheets having the plurality of stripe-type inner electrode patterns printed thereon; cutting the laminate in order to have a structure in which first and second inner electrode patterns are alternately stacked; and forming a first side part and a second side part by applying ceramic slurry in order to cover the sides of the laminate to which the first and second inner electrode patterns are exposed.

4 Claims, 5 Drawing Sheets

(51) Int. Cl.
  *H01G 4/008* (2006.01)
  *H01G 4/012* (2006.01)
  *H01G 4/248* (2006.01)

(52) U.S. Cl.
  CPC .............. *H01G 4/248* (2013.01); *Y10T 29/43* (2015.01); *Y10T 29/435* (2015.01)

(56) References Cited

U.S. PATENT DOCUMENTS

| | | | |
|---|---|---|---|
| 5,822,174 | A | 10/1998 | Yamate et al. |
| 9,196,422 | B2* | 11/2015 | Kim ........................ H01G 4/005 |
| 2008/0304204 | A1* | 12/2008 | Suzuki .................... H01G 4/012 361/321.3 |
| 2010/0085682 | A1 | 4/2010 | Abe et al. |
| 2012/0229952 | A1* | 9/2012 | Kim ....................... H01G 4/005 361/321.2 |

FOREIGN PATENT DOCUMENTS

| | | |
|---|---|---|
| JP | 11-097285 A | 4/1999 |
| JP | 2002-305127 A | 10/2002 |
| JP | 2004-186342 A | 7/2004 |
| JP | 2006-324538 A | 11/2006 |
| JP | 2009-135209 A | 6/2009 |
| JP | 2010-092896 A | 4/2010 |
| JP | 2010-153720 A | 7/2010 |
| KR | 10-2006-0026933 A | 3/2006 |

OTHER PUBLICATIONS

Japanse Office Action issued in Japanese Application No. 2011-164053 dated Jun. 17, 2014, w/English translation.

Korean Office Action, and English translation thereof, issued in Korean Patent Application No. 10-2010-0126974 dated Feb. 2, 2012.

Non-Final Office Action issued in U.S. Appl. No. 13/191,849 dated Sep. 27, 2013.

Final Office Action issued in U.S. Appl. No. 13/191,849 dated Apr. 29, 2014.

Notice of Allowance issued in U.S. Appl. No. 13/191,849 dated Jun. 10, 2015.

* cited by examiner

MULTILAYER CERAMIC CONDENSER AND METHOD OF MANUFACTURING THE SAME

CROSS-REFERENCE TO RELATED APPLICATIONS

This application is a divisional of U.S. application Ser. No. 13/191,849 filed on Jul. 27, 2011, which in turn claims the priority of Korean Patent Application No. 10-2010-0126974 filed on Dec. 13, 2010, in the Korean Intellectual Property Office, the disclosure of which is incorporated herein by reference.

BACKGROUND OF THE INVENTION

Field of the Invention

The present invention relates to a multilayer ceramic condenser and a method of manufacturing the same, and more particularly, to a method of manufacturing a multilayer ceramic condenser having improved reliability by securing the durability thereof, and a multilayer ceramic condenser manufactured by the method.

Description of the Related Art

A condenser, which is a device capable of storing electricity, stores electricity in individual electrodes thereof by applying voltage to two opposing electrodes. When DC voltage is applied to the condenser, current flows in the condenser while electricity is stored therein, but when the storage of electricity is completed, current does not flow in the condenser. On the other hand, when AC voltage is applied to the condenser, AC current flows continuously in the condenser while the polarity of the electrodes is alternated.

Depending on a type of an insulator provided between electrodes, the condenser may be classified as an aluminum electrolytic condenser in which electrodes are made of aluminum and a thin oxide layer is provided between the aluminum electrodes, a tantalum electrolytic condenser using tantalum as an electrode material, a ceramic condenser using a high-K dielectric such as barium titanate between electrodes, a multilayer ceramic condenser (MLCC) using a multilayer structure made of high-K ceramic as a dielectric provided between electrodes, a film condenser using a polystyrene film as a dielectric between electrodes, or the like.

Among those condensers, the multilayer ceramic condenser may be miniaturized while having excellent temperature and frequency characteristics, such that it has been frequently used for various applications, such as a high frequency circuit, or the like.

In the multilayer ceramic condenser according to the related art, a laminate may be formed by stacking a plurality of dielectric sheets, outer electrodes having different polarities may be formed at the outside of the laminate, and inner electrodes alternately stacked in the laminate may be electrically connected to the outer electrodes, respectively.

The inner electrodes, alternately formed between the dielectric sheets, are connected to oppose each other and have opposing polarities to generate capacitance coupling, such that the multilayer ceramic condenser has a capacitance value.

Recently, as electronic products have been miniaturized and have become highly integrated, research into miniaturizing and highly integrating the multilayer ceramic condenser has been frequently conducted. In particular, various attempts have been made to improve the connectivity between the inner electrode patterns while thinning and increasing the stacking amount of the dielectric layers in order to implement a high-capacity and small-sized multilayer ceramic condenser.

SUMMARY OF THE INVENTION

An aspect of the present invention provides a multilayer ceramic condenser capable of improving printing resolution of inner electrode patterns in order to highly stack and miniaturize the multilayer ceramic condenser, removing steps of a plurality of stacked dielectric layers, and improving an accelerated life of insulating resistance, and a method of manufacturing the same.

According to an aspect of the present invention, there is provided a method of manufacturing a multilayer ceramic condenser, the method including: printing a plurality of stripe-type inner electrode patterns in parallel on a plurality of ceramic green sheets in a major-axis direction of the stripe-type inner electrode patterns; and printing line patterns between the plurality of stripe-type inner electrode patterns, respectively, in the major-axis direction of the line patterns.

The line patterns may be printed simultaneously with the stripe-type inner electrode patterns or printed after the stripe-type inner electrode patterns have been completely printed.

The following Formula 1, with respect to a and b, may be satisfied, where an interval between the plurality of stripe-type inner electrode patterns is defined by a and a width of the line pattern is defined by b:

$$1\ \mu m \leq a - 2b \leq 200\ \mu m \qquad \text{Formula 1.}$$

The stripe-type inner electrode patterns and the line patterns may be printed to have an interval of 110 μm or less therebetween.

A width of the line pattern may be 60 μm or less when an interval between the plurality of stripe-type inner electrode patterns is 140 μm.

A width of the line pattern may be 40 μm or less when an interval between the plurality of stripe-type inner electrode patterns is 120 μm.

A ratio of spreading areas to printed areas of the plurality of stripe-type inner electrode patterns and the line patterns may be 12% or less.

The method may further include stacking the plurality of ceramic green sheets such that the stripe-type inner electrode patterns formed thereon are alternately stacked; and forming a plurality of multilayer main bodies by cutting the plurality of ceramic green sheets.

The alternately stacking of the stripe-type inner electrode patterns may include stacking the plurality of ceramic green sheets such that central portions of the stripe-type inner electrode patterns and central portions of the line patterns may be disposed in an overlapping manner on adjacent ceramic green sheets to be disposed on a common axis.

The cutting of the plurality of ceramic green sheets may include forming a bar-type laminate having a first cutting surface and a second cutting surface by cutting the plurality of ceramic green sheets in a direction vertical to the plurality of stripe-type inner electrode patterns; and forming a multilayer main body having a third cutting surface and a fourth cutting surface by cutting the bar-type laminate into a chip sized pieces in order to include central portions of the stripe-type inner electrode patterns and central portions of the line patterns disposed on adjacent ceramic green sheets.

The method may further include forming a first side part and a second side part by applying ceramic slurry to the first cutting surface and the second cutting surface of the bar-type laminate, respectively, before or after the bar-type laminate is cut into the plurality of multilayer main bodies.

The method may further include forming a first outer electrode and a second outer electrode on the third cutting surface and the fourth cutting surface of the multilayer main body, respectively.

According to another aspect of the present invention, there is provided a multilayer ceramic condenser including: a multilayer main body having a plurality of dielectric layers stacked therein and including a first side, a second side, a third side, and a fourth side; a first outer electrode and a second outer electrode respectively formed on the first side and the third side opposing each other on the multilayer main body; a first inner electrode pattern and a second inner electrode pattern formed within the multilayer main body so as to be exposed to the first side and the third side and to cover the dielectric layers at a predetermined interval from the third side and the first side, respectively; and a second dummy pattern and a first dummy pattern formed between the third side and the first inner electrode pattern and between the first side and the second inner electrode pattern, respectively, wherein a distance between the first inner electrode pattern and the second dummy pattern or between the second inner electrode pattern and the first dummy pattern is 70 μm or less.

A distance between the first inner electrode pattern and the third side or between the second inner electrode pattern and the first side may be 150 μm or less.

The multilayer ceramic condenser may further include a first side part and a second side part formed by applying the ceramic slurry to the second side and the fourth side opposing each other on the multilayer main body, respectively.

The following Formula 2 may be satisfied, where a height of the multilayer main body is h1 and a height of a portion in which steps are formed due to the first and second inner electrode patterns formed in the multilayer main body is h2:

$$(h1-h2)/h1 \leq 0.1 \quad \text{Formula 2.}$$

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will be described in detail with reference to the accompanying drawings, which will fully convey the concept of the invention to those skilled in the art. Moreover, detailed descriptions related to well-known functions or configurations will be ruled out in order not to unnecessarily obscure the subject matter of the present invention. It is also noted that like reference numerals denote like elements in appreciating the drawings.

In addition, unless explicitly described to the contrary, the word "comprise" and variations such as "comprises" or "comprising," as well as the word "include" and variations such as "includes" and "including," will be understood to imply the inclusion of stated elements but not the exclusion of any other elements.

Hereinafter, a multilayer ceramic condenser and a method of manufacturing the same according to an exemplary embodiment of the present invention will be described with reference to FIGS. 1 to 6.

Figure 1:
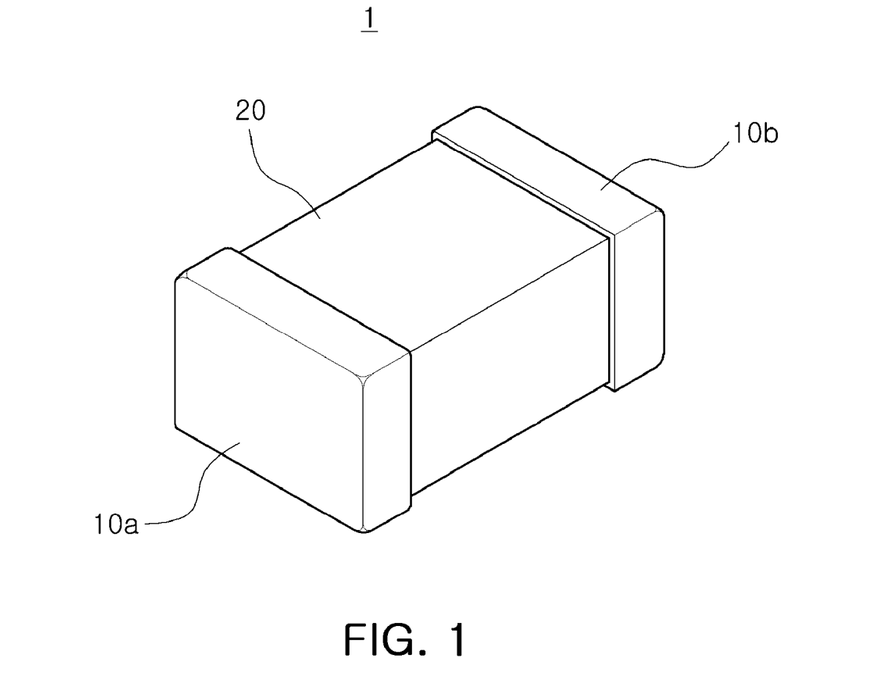
FIG. 1 is a perspective view of a multilayer ceramic condenser according to an exemplary embodiment of the present invention.
Figure 2A:
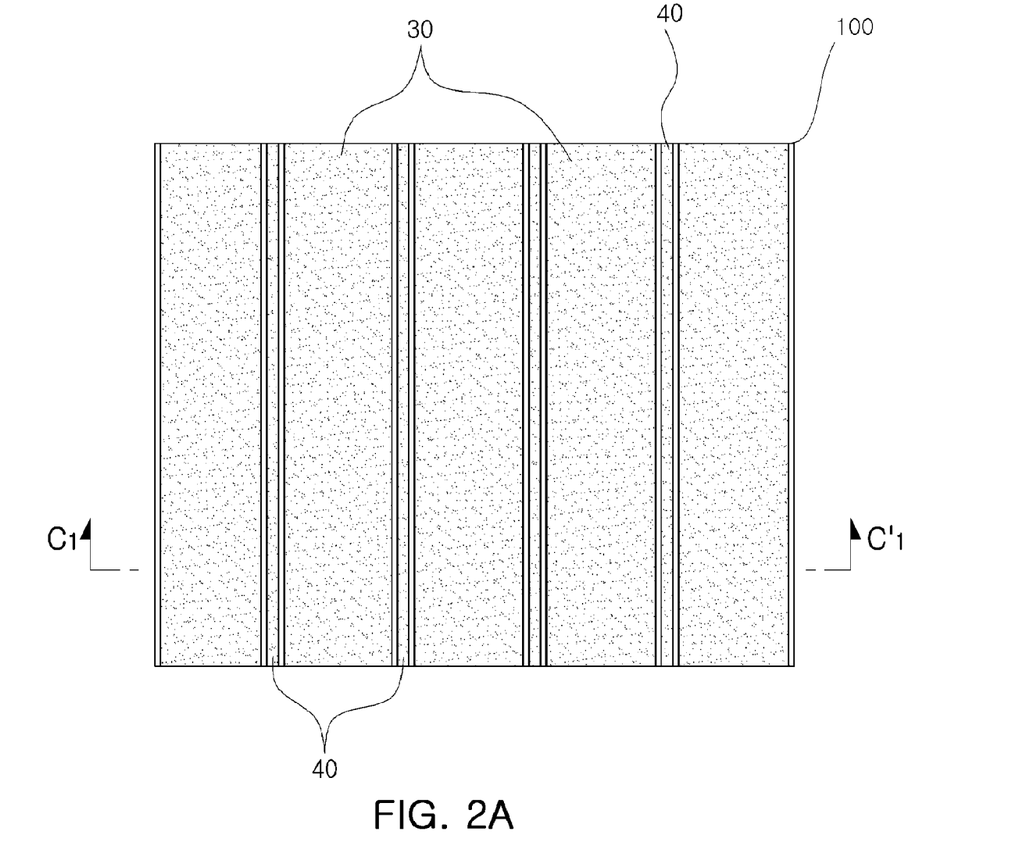
FIGS. 2A and 2B are a plan view and a front view showing a ceramic green sheet having stripe-type inner electrode patterns and line patterns printed thereon according to an exemplary embodiment of the present invention.
Figure 2B:
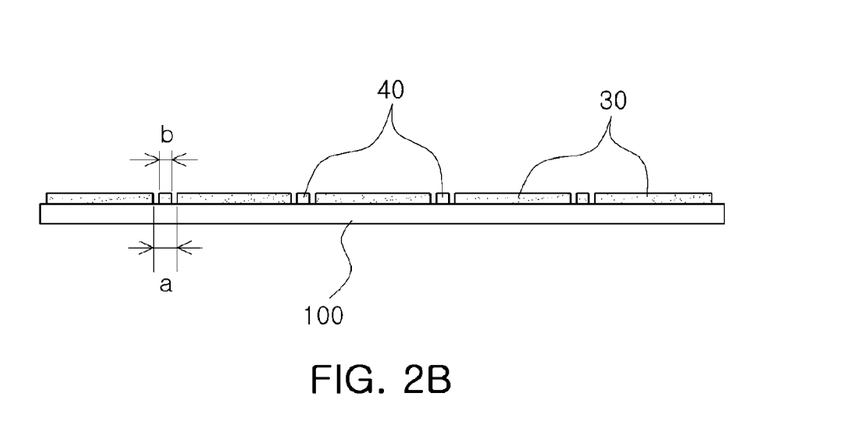
Figure 3A:
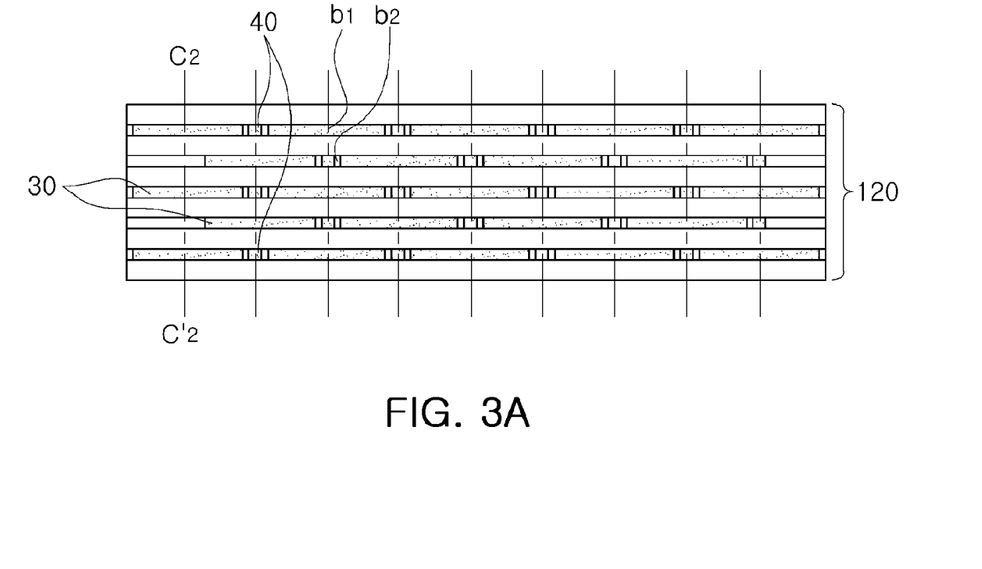
FIG. 3A is a front view showing a laminate in which a plurality of ceramic green sheets are stacked according to an exemplary embodiment of the present invention.
Figure 3B:
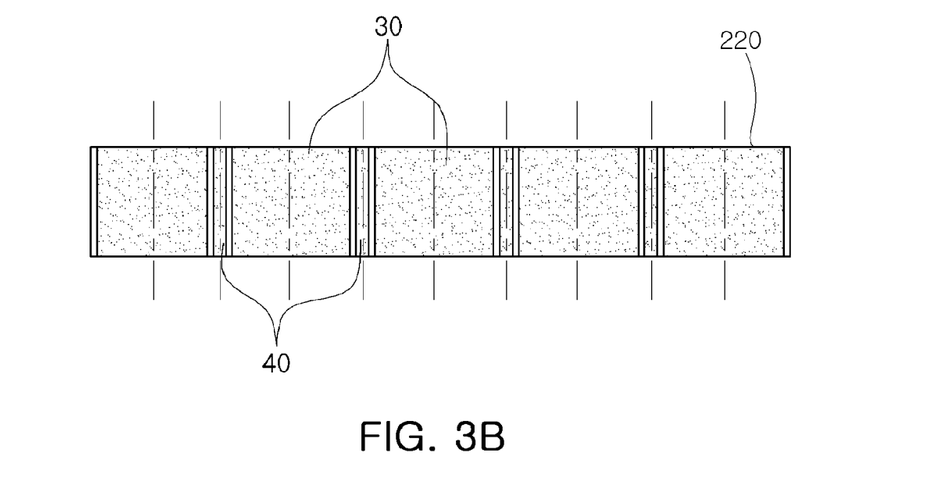
FIG. 3B is a plan view showing a cutting line of a bar-type laminate according to an exemplary embodiment of the present invention.
Figure 4:
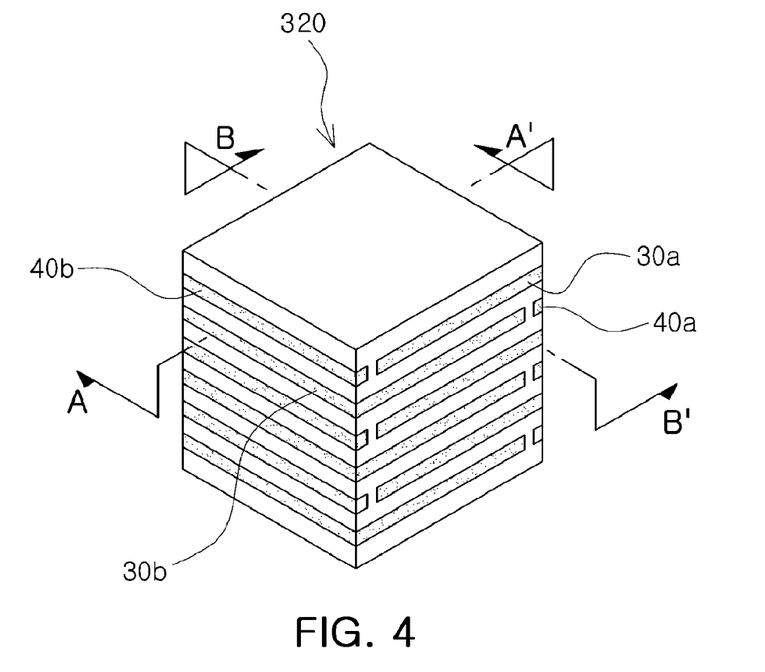
FIG. 4 is a perspective view showing a multilayer main body according to an exemplary embodiment of the present invention.
Figure 5A:
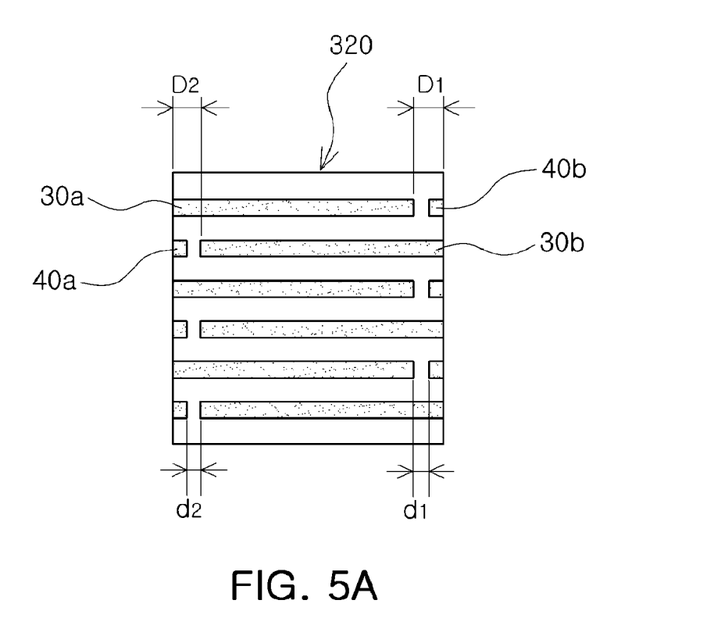
FIG. 5A is a cross-sectional view of the multilayer main body shown in FIG. 4, taken along line A-A'.
Figure 5B:
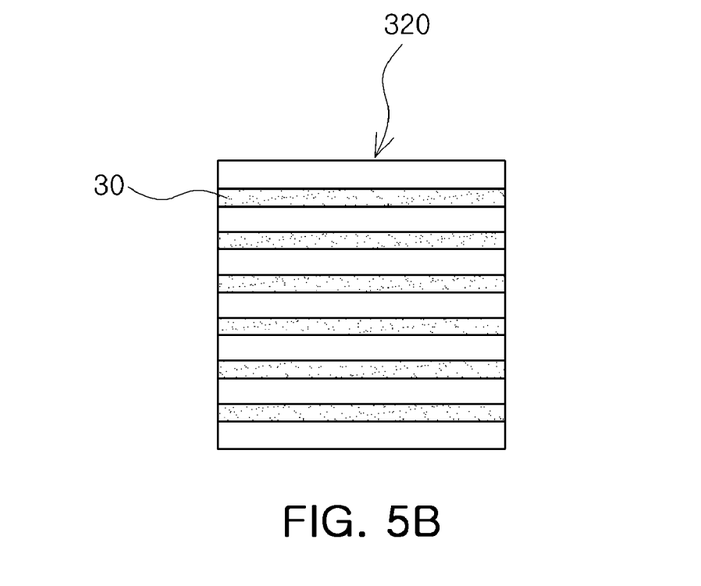
FIG. 5B is a cross-sectional view of the multilayer main body shown in FIG. 4, taken along line B-B'.
Figure 6:
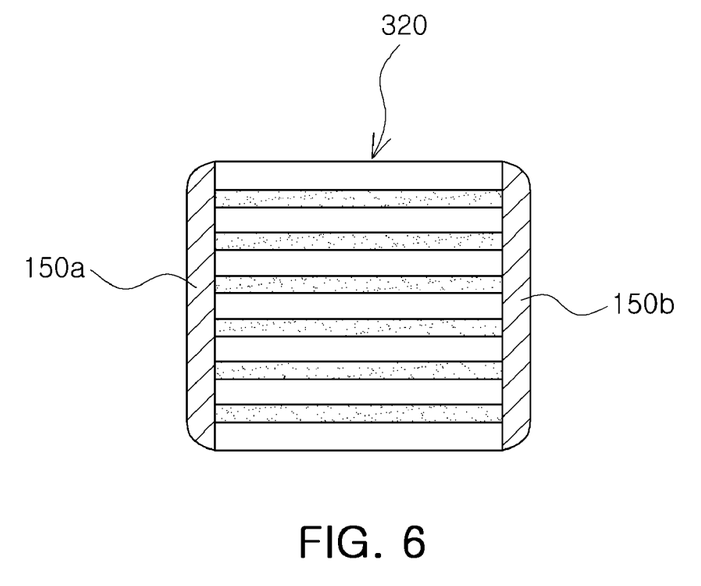
FIG. 6 is a cross-sectional view of a multilayer main body having side parts according to an exemplary embodiment of the present invention.

FIG. 1 is a perspective view of a multilayer ceramic condenser according to an exemplary embodiment of the present invention; FIGS. 2A and 2B are a plan view and a front view showing a ceramic green sheet having stripe-type inner electrode patterns and line patterns printed thereon according to an exemplary embodiment of the present invention; FIG. 3A is a front view showing a laminate in which a plurality of ceramic green sheets are stacked according to an exemplary embodiment of the present invention; FIG. 3B is a plan view showing a cutting line of a bar-type laminate according to an exemplary embodiment of the present invention; FIG. 4 is a perspective view showing a multilayer main body according to an exemplary embodiment of the present invention; FIG. 5A is a cross-sectional view of the multilayer main body shown in FIG. 4, taken along line A-A'; FIG. 5B is a cross-sectional view of the multilayer main body shown in FIG. 4, taken along line B-B'; and FIG. 6 is a cross-sectional view of a multilayer main body having a side part according to an exemplary embodiment of the present invention.

Referring to FIG. 1, a multilayer ceramic condenser 1 according to an exemplary embodiment of the present invention may include a multilayer main body 20 in which a plurality of dielectric layers are stacked, a first outer electrode 10a, a second outer electrode 10b, a first inner electrode pattern, and a second inner electrode pattern.

The plurality of dielectric layers may be stacked so as to form a multilayer ceramic body 20. The multilayer main body 20 may be formed to include a first side, a second side, a third side, and a fourth side in sequence.

The first outer electrode 10a and the second outer electrode 10b may be provided on the first side and the third side, opposing each other on the multilayer main body, respectively. The first and second inner electrode patterns may be alternately stacked within the multilayer main body, having at least one dielectric layer disposed therebetween. The first and second inner electrode patterns may be formed to be exposed to the first side and the third side, respectively, such that they may be connected to the first outer electrode 10a and the second outer electrode 10b, respectively.

The plurality of dielectric layers forming the multilayer main body may be manufactured by using ceramic green sheets having a predetermined dielectric constant.

The first outer electrode 10a and the second outer electrode 10b may be made of a material having excellent conductivity and may serve to electrically connect the multilayer ceramic condenser to external devices. Without being limited thereto, the first outer electrode 10a and the second outer electrode 10b may be made of Ni, Ag, Pd, or the like.

As the multilayer main body 20 has a large amount of layers stacked therein, the amount of the steps of the dielectric layers is increased and the thickness of the inner electrode patterns is reduced. Therefore, the incidence of short-circuits within the inner electrode patterns may be increased.

However, according to an exemplary embodiment of the present invention, the line patterns are formed between the inner electrode patterns, which serve as dummy patterns removing the steps of the dielectric layers when the dielectric layers are stacked, thereby reducing an interlayer density between the dielectric layers and the inner electrode layers.

Therefore, even if the plurality of dielectric layers are stacked, a deviation in thickness between the plurality of dielectric layers may be reduced and the occurrence of steps on the surface of the dielectric layers may be prevented.

In addition, according to an exemplary embodiment of the present invention, even if the thin inner electrode patterns and the dielectric layers are formed, the inner electrode patterns are formed to entirely cover the dielectric layers, such that the coverage between the first and second inner electrode patterns formed in the multilayer main body 20 is improved and an overlapping area therebetween is increased, thereby securing the capacitance of the multilayer ceramic condenser.

Hereinafter, a method of manufacturing a multilayer ceramic condenser, in which a plurality of dielectric layers having small steps are stacked, according to an exemplary embodiment of the present invention will be described.

FIGS. 2A and 2B are a plan view and a front view showing a ceramic green sheet having stripe-type inner electrode patterns 30 and line patterns 40 printed thereon according to an exemplary embodiment of the present invention.

Referring to FIG. 2A, in order to manufacture the multilayer ceramic condenser according to the exemplary embodiment of the present invention, the dielectric layer may be formed by stacking the plurality of ceramic green sheets 100.

The ceramic green sheet 100 may be formed by applying a ceramic paste, including a ceramic powder, an organic solvent, and an organic binder, to a carrier film and drying thereof.

The ceramic powder is a high-K material. Without being limited thereto, a barium titanate ($BaTiO_3$)-based material, a lead complex Perovskite-based material, a strontium titanate ($SrTiO_3$)-based material, or the like, may be used therefor, preferably, a barium titanate ($BaTiO_3$)-based powder may be used.

The organic binder is included to secure the dispersibility of the ceramic powder. Without being limited thereto, ethyl cellulose, polyvinyl butyral, and a mixture thereof may be used therefor.

The ceramic green sheet 100 may be formed by applying the ceramic paste to the carrier film such as polyethylene terephthalate, or the like, but is not limited thereto.

After the ceramic green sheet 100 is formed, the plurality of inner electrode patterns 30 and the plurality of line patterns 40 may be printed on the ceramic green sheet 100.

The stripe-type inner electrode patterns 30 and the line patterns 40 may be made of a material having excellent electric conductivity, including a conductive metal according to the exemplary embodiment of the present invention. Further, as the conductive metal, at least one selected from a group consisting of Ni, Cu, Pd, and an alloy thereof may be used.

The stripe-type inner electrode pattern 30 and the line pattern 40 may be formed by printing the inner electrode paste including the conductive material on the ceramic green sheet 100. Without being limited thereto, the stripe-type inner electrode pattern 30 and the line pattern 40 may be printed on the ceramic green sheet by a printing method such as a screen printing method.

According to the exemplary embodiment of the present invention, the plurality of stripe-type inner electrode patterns 30 printed on the ceramic green sheets 100 may be printed in parallel with each other, in particular, may be printed in a major-axis direction.

In addition, the line-shaped line patterns 40 may be printed between the plurality of stripe-type inner electrode patterns 30. The line patterns 40 may be printed between the plurality of stripe-type inner electrode patterns 30 to be in parallel with the stripe-type inner electrode patterns 30. In addition, the line patterns 40 may be simultaneously printed while the stripe-type inner electrode patterns 30 are printed or may be printed after the stripe-type inner electrode patterns 30 are printed.

In particular, when the screen printing method is used, a screen used for the screen printing method is formed to include a portion in which an emulsion layer is formed and a portion in which an emulsion layer is not formed. In particular, the inner electrode patterns may be printed by passing the inner electrode paste through the portion in which the emulsion layer is not formed, when the screen provided with the electrode paste is pressed by a squeegee.

In the case in which the inner electrode patterns are printed in a minor-axis direction, it alternately passes through the portion in which the emulsion layer is formed and the portion in which the emulsion layer is not formed, such that friction is generated between the squeegee and the screen, thereby causing the inner electrode paste to be excessively spread in the printing direction.

However, according to the exemplary embodiment of the present invention, the stripe-type inner electrode patterns are printed, in particular, the printing proceeds in the major-axis direction along the stripe direction, such that the squeegee only passes through the portion in which the emulsion layer is not formed or the portion in which the emulsion layer is formed. Therefore, friction between the squeegee and the screen is reduced and the spreading of the paste is reduced accordingly.

Consequently, according to the exemplary embodiment of the present invention, the stripe-type inner electrode patterns are printed in the major-axis direction, such that the spreading of the paste is reduced. Therefore, a printing resolution is increased and the intervals between the inner electrode patterns and the dummy patterns are narrowed.

The printing resolution is a value that represents the definition of printing. In the exemplary embodiment of the present invention, the printing resolution is determined based on the spreading ratio. That is, the printing resolution is determined by the spreading ratio that is a ratio of spreading area to printed area. The higher the spreading ratio is, the lower the printing resolution becomes, and the lower the spreading ratio is, the higher the printing resolution becomes.

According to the exemplary embodiment of the present invention, the ratio of the spreading area to the printed area of the stripe-type inner electrodes and the line patterns may be 12% or less. When the stripe-type inner electrode patterns 30 are printed in the major-axis direction, the friction between the screen and the squeegee is reduced and the spreading ratio is reduced accordingly.

Referring to FIG. 2B, the stripe-type inner electrode patterns 30 are spaced apart from the line patterns 40 having a predetermined interval therebetween. The line patterns 40 are cut to thereby form the dummy patterns, such that they are spaced apart from the inner electrode patterns to be electrically insulated therefrom.

When the stripe-type inner electrode patterns 30 are printed to be adjacent to the line patterns, the stripe-type inner electrode patterns 30 and the line patterns 40 may be short-circuited with each other due to the spreading.

However, according to the exemplary embodiment of the present invention, since the spreading ratio is lowered by printing the patterns in the major-axis direction, the short-circuits between the inner electrode patterns and the line patterns can be prevented even if the intervals between the inner electrode patterns and the line patterns are reduced.

Referring to FIG. 2B, in the case in which the interval between the stripe-type inner electrode patterns 30 is defined by a and the width of the line pattern 40 is defined by b, a and b may meet the following Formula 1:

$$1\ \mu m \leq a-2b \leq 200\ \mu m \qquad \text{Formula 1}$$

A value of a−2b is 1 μm to 200 μm. In the case in which the value of a−2b is larger than 200 μm, the stripe-type inner electrode pattern is excessively away from the line pattern, such that it is difficult to remove the steps. On the other hand, in the case in which the value of a−2b is less than 1 μm, the inner electrode pattern may overlap with the line pattern.

According to the exemplary embodiment of the present invention, in the case in which the interval a between the plurality of stripe-type inner electrode patterns is 140 μm or less, the width b of the line pattern may be 60 μm or less. In the case in which the interval a exceeds 60 μm, the stripe-type inner electrode pattern and the line pattern may overlap with each other by being spread to each other.

In addition, according to another exemplary embodiment of the present invention, if the interval a between the plurality of stripe-type inner electrode patterns is 120 μm, the width b of the line pattern may be 40 μm or less. In the case in which the interval a exceeds 40 μm, the stripe-type inner electrode pattern and the line pattern may overlap with each other.

In addition, the interval between the stripe-type inner electrode pattern and the line pattern may be 110 μm or less. In the case in which the interval between the stripe-type inner electrode pattern and the line pattern exceeds 110 μm, the intervals between the patterns are excessively away from each other, such that it is difficult to secure an area allowing the inner electrode pattern to occupy sufficient capacity.

According to the exemplary embodiment of the present invention, the ratio of spreading area to printed area may be 12% or less. When the stripe-type inner electrode patterns are printed in the major-axis direction, the friction between the screen and the squeegee is reduced, such that the spreading area may be reduced.

FIG. 3A is a cross-sectional view showing a laminate 120 formed by stacking the plurality of ceramic green sheets 100 on which the stripe-type inner electrode patterns 30 and the line patterns 40 are printed.

Referring to FIG. 3A, the plurality of ceramic green sheets 100, on which the plurality of stripe-type inner electrode patterns 30 and the line patterns 40 are printed, may be alternately stacked such that the stripe-type inner electrode patterns 30 and the line patterns 40 are disposed in an overlapping manner on adjacent ceramic green sheets.

Referring to FIG. 3, alternately stacking the ceramic green sheets 100 implies that central portions b1 of the stripe-type inner electrode patterns 30, printed on one ceramic green sheet 100, and central portions b2 of the line patterns 40, printed on adjacent ceramic green sheets, are disposed on a common axis.

The laminate 120, in which the plurality of ceramic green sheets 100 are alternately stacked, may be cut to have a chip size later.

Referring to FIG. 2A, the ceramic green sheets 100 having the plurality of stripe-type inner electrode patterns 30 and the line patterns 40 printed thereon are cut along line C1-C1' to thereby form a first cutting surface and a second cutting surface. The first cutting surface may have a shape shown in FIG. 3A and the second cutting surface may have a shape symmetrical to that shown in FIG. 3A.

Line C1-C1' is a line formed to vertically traverse the stripe-type inner electrode patterns 30 and the line patterns 40. When the stripe-type inner electrode patterns 30 and the line patterns 40 are cut along line C1-C1' of FIG. 2A, they may be cut as a bar-type laminate 220 so as to have the same plane shape as that of FIG. 3B.

The bar-type laminate 220 may have a front view having the same shape as that of FIG. 3A and a plan view having the same shape as that of FIG. 3B. Referring to FIGS. 3A and 3B, the bar-type laminate may be cut along line C2-C2' so as to have a chip size.

Line C2-C2' is formed to alternately include the central portions b1 of the stripe-type inner electrode patterns 30 and the central portions b2 of the line patterns. Therefore, a third cutting surface and a fourth cutting surface cut along line C2-C2' each have a structure in which the inner electrode pattern and the cut dummy pattern are alternately formed.

In particular, a first inner electrode pattern 30a and a first dummy pattern 40a are formed to alternately exposed to the third cutting surface and a second inner electrode pattern 30b and a second dummy pattern 40b are formed to be alternately exposed to the fourth cutting surface.

Referring to FIG. 4, the cut multilayer main body 320 is provided with a first side to which the first inner electrode pattern 30a and the first dummy pattern 40a are alternately exposed and a third side to which the second inner electrode pattern 30b and the second dummy pattern 40b are alternately exposed, when being viewed from direction A-A', wherein the first side and the third side correspond to the third cutting surface and the fourth cutting surface formed by being cut along line C2-C2'.

In addition, the multilayer main body 320 cut along direction B-B' is provided with the second side and the fourth side, to which the first inner electrode pattern 30a, the second inner electrode pattern 30b, the first dummy pattern 40a, and the second dummy pattern 40b are exposed, wherein the second side and the fourth side are disposed to oppose each other.

FIG. 5A is a cross-sectional view of the multilayer main body, taken along line A-A'.

Referring to FIG. 5A, the multilayer main body 320 is formed by stacking a plurality of dielectric layers. In the inside of the multilayer main body 320, the first inner electrode pattern 30a and the second inner electrode pattern 30b are alternately staked, while having at least one dielectric layer disposed therebetween. The first inner electrode pattern 30a and the second inner electrode pattern 30b are formed to be exposed to the first side and the third side, respectively, and have an overlapping area by being disposed to oppose each other while having at least one dielectric layer disposed therebetween.

The first side of the multilayer main body 320 may be provided with a first outer electrode electrically connected to the first inner electrode pattern 30a and the third side of the multilayer main body 320 may be provided with a second outer electrode electrically connected to the second inner electrode pattern 30b.

In addition, according to the exemplary embodiment of the present invention, the first inner electrode pattern 30a and the first dummy pattern 40a may be formed to be alternately exposed to the first side while having at least one dielectric layer disposed therebetween. In addition, the second inner electrode pattern 30b and the second dummy pattern 40b may be formed to be alternately exposed to the third side while having at least one dielectric layer disposed therebetween.

The first side of the multilayer main body 320 may be provided with the first outer electrode electrically connected with the first inner electrode pattern 30a and the third side of the multilayer main body 320 may be provided with the second outer electrode electrically connected with the second inner electrode pattern 30b.

Referring to FIG. 5A, the first inner electrode pattern 30a may be formed to entirely cover the dielectric layer while having a predetermined interval D1 with the third side having the second outer electrode in order to be insulated from the second outer electrode. The second inner electrode pattern 30b may be formed to entirely cover the dielectric layer while having a predetermined interval D2 with the first side having the first outer electrode in order to be insulated from the first outer electrode.

However, a space between the first inner electrode pattern 30a and the third side or between the second inner electrode pattern 30b and the first side has a relatively small interlayer density, which may be a step in the multilayer main body. Therefore the thickness of the multilayer main body may be reduced towards the first side and the third side thereof.

Therefore, according to the exemplary embodiment of the present invention, the space between the first inner electrode pattern 30a and the third side or between the second inner electrode pattern 30b and the first side may be provided with the second dummy pattern 40b and the first dummy pattern 40a.

The first dummy pattern 40a and the second dummy pattern 40b may be formed by cutting the line patterns 40 at a chip size and be disposed in the space between the first inner electrode pattern 30a and the third side or between the second inner electrode pattern 30b and the first side to prevent the formation of the interlayer step, thereby forming the multilayer main body having a uniform thickness.

According to the exemplary embodiment of the present invention, the first inner electrode pattern 30a and the second dummy pattern 40b are formed on the same dielectric layer, such that they may be spaced apart from each other to have interval d1 therebetween, wherein the interval d1 corresponds to a minimum insulating distance enough to maintain electrical insulation between the first inner electrode pattern 30a and the second dummy pattern 40b.

In addition, according to the exemplary embodiment of the present invention, the second inner electrode pattern 30b and the first dummy pattern 40a are formed on the same dielectric layer, and they may be spaced apart from each other to have interval d2 therebetween. Further, the interval d2 corresponds to a minimum insulating distance enough to maintain electrical insulation between the second inner electrode pattern 30b and the first dummy pattern 40a.

According to the exemplary embodiment of the present invention, the inner electrode pattern is formed by cutting the stripe-type inner electrode patterns and the dummy pattern is formed by cutting the line patterns. The inner electrode pattern and the dummy pattern may be formed by stacking and compressing the stripe-type inner electrode patterns and the line patterns, and the intervals therebetween may be reduced.

Referring to FIG. 5A, the distance between the first inner electrode pattern 30a and the third side is represented by D1; the distance between the second inner electrode pattern 30b and the first side is represented by D2; the distance between the first inner electrode pattern and the second dummy pattern is represented by d1; and the distance between the second inner electrode pattern and the first dummy pattern is represented by d2.

According to the exemplary embodiment of the present invention, D1 and D2, corresponding to the distance between the inner electrode pattern and the side, may be 150 μm or less. If the distance exceeds 150 μm, it is difficult to secure the capacity of the inner electrode pattern.

According to the exemplary embodiment of the present invention, the intervals d1 and d2 between the inner electrode pattern and the dummy pattern may be 70 μm or less. In the case in which the intervals have a value of 70 μm or more, it is difficult to secure the capacity of the inner electrode pattern and relive the steps.

FIG. 5B is a cross-sectional view of the multilayer main body 320 shown in FIG. 4, taken along line B-B'.

Referring to FIG. 5B, the multilayer main body 320 is formed by stacking the plurality of dielectric layers. The plurality of inner electrode patterns 30 are stacked within the multilayer main body 320 so as to entirely cover the dielectric layers other than the minimum area required to maintain the minimum insulation, thereby preventing the steps from being formed in direction B-B'.

As a result, even if a plurality of thin dielectric layers are formed, individual dielectric layers do not have steps in both the direction A-A' and the direction B-B', such that the plurality of dielectric layers may have a substantially uniform thickness.

Further, the multilayer main body 320 including the plurality of dielectric layers having the uniform thickness may also have a substantially uniform thickness.

In more detail, if the height of the multilayer main body 320 is h1 and the height of portions, in which the steps are formed due to the first and second inner electrode patterns formed in the multilayer main body, is h2, the height h1 and h2 may meet the following Formula 2:

$$(h1-h2)/h1 \leq 0.1 \qquad \text{Formula 2}$$

In other words, the difference between the height h1 of the multilayer main body 320 and the height h2 of the portions in which the steps are formed may be 10% or less. Therefore, the multilayer main body 320 may have a substantially uniform thickness.

As the height of the depressed portions due to the formation of the steps is reduced, the multilayer main body 320 may have a uniform thickness. As the difference between the height h1 and h2 of the multilayer main body 320 is reduced, the plurality of dielectric layers may have a uniform thickness, so that interlayer short defects caused by the formation of the steps may be solved.

In the case of the multilayer ceramic condenser 1 manufactured according to the exemplary embodiment of the present invention, the inner electrode patterns are formed to cover the dielectric layers, such that the plurality of dielectric layers, when being stacked, have a uniform thickness. Therefore, the multilayer main body having almost few steps may be formed.

According to the exemplary embodiment of the present invention, the inner electrode patterns are formed to cover the dielectric layers, such that the first side part and the second side part may be formed by applying the ceramic slurry to the sides to which the first inner electrode pattern and the second inner electrode pattern are exposed, thereby manufacturing the multilayer ceramic condenser in which the dielectric layers having the uniform thickness are stacked and the multilayer ceramic condenser in which the first side part and the second side part having a predetermined thickness are formed.

As set forth above, in the method of manufacturing multilayer ceramic condenser according to the exemplary embodiment of the present invention, the stripe-type inner electrode patterns and the line patterns are printed on the dielectric layers in the major-axis direction, thereby improving the printing resolution. Further, as the printing resolution is increased, the minimum intervals between the inner electrode patterns and the dummy patterns can be secured and the size of chips can be reduced accordingly.

Further, in the method of manufacturing a multilayer ceramic condenser according to the exemplary embodiment of the present invention, the steps of the dielectric layers are removed due to the printing of the dummy patterns, thereby manufacturing the chips having few deviations in the interlayer thickness of the dielectric layers. Further, the inner electrode patterns are not formed on portions of the dielectric layers but formed to cover the dielectric layers, thereby removing the steps of the dielectric layers in the multilayer main body. The steps of the multilayer ceramic condenser are minimized to thereby secure the electrical connectivity of the inner electrode patterns, whereby the reliability of products can be improved.

Inventive Example

TABLE 1

| Interval (a) Between Stripe-Type Inner Electrode Patterns | Width (b) of Line Pattern | Printing Overlapped |
|---|---|---|
| 140 μm | 30 μm | x |
|  | 40 μm | x |
|  | 50 μm | x |
|  | 60 μm | x |
|  | 70 μm | o |
| 120 μm | 30 μm | x |
|  | 40 μm | x |
|  | 50 μm | o |

According to the exemplary embodiment of the present invention, the line patterns were printed to have the interval a of 140 μm and 120 μm between the plurality of stripe-type inner electrode patterns.

It was confirmed whether or not the stripe-type inner electrode patterns and the line patterns overlapped, by varying the widths b of the line patterns between a stripe-type inner electrode pattern and adjacent stripe-type inner electrode patterns.

Referring to the above Table, in the case in which the interval a between the stripe-type inner electrode patterns was 140 μm or less, it could be confirmed that when the line pattern was printed to have the width of 60 μm or less, the overlapping between the stripe-type inner electrode patterns and the line patterns did not occur.

In addition, in the case in which the interval a between the stripe-type inner electrode patterns was 120 μm or less, it could be confirmed that when the line pattern was printed to have the width of 40 μm or less, the overlapping did not occur.

As set forth above, in a method of manufacturing a multilayer ceramic condenser according to exemplary embodiments of the present invention, stripe-type inner electrode patterns and line patterns are printed on the dielectric layers in a major-axis direction, thereby improving the printing resolution thereof. Therefore, as the printing resolution is improved, the stripe-type inner electrode patterns and the line patterns disposed to have minimum intervals therebetween can be printed.

Further, a method of manufacturing a multilayer ceramic condenser according to exemplary embodiments of the present invention removes steps of the dielectric layers by printing the line patterns, thereby manufacturing chips having few deviations in the interlayer thickness of the dielectric layers. Further, the inner electrode patterns are not formed on portions of the dielectric layers but are formed to entirely cover the dielectric layers, thereby removing the steps of the dielectric layers in the multilayer main body.

In addition, in a multilayer ceramic condenser according to exemplary embodiments of the present invention, the inner electrode patterns are formed such that they cover the dielectric layers to thereby secure the overlapping areas between the first inner electrode patterns and the second inner electrode patterns. Since thin dielectric layers and inner electrode patterns are formed, the multilayer ceramic condenser may be miniaturized and have a large amount of layers stacked therein.

Further, after manufacturing the multilayer main body, side parts may be formed to have a desired thickness on the sides of the multilayer main body, to which the first and second inner electrode patterns are exposed, so as to maximally secure a space occupied by the inner electrode patterns, thereby improving the flexibility of product design.

While the present invention has been shown and described in connection with the exemplary embodiments, it will be apparent to those skilled in the art that modifications and variations can be made without departing from the spirit and scope of the invention as defined by the appended claims.

What is claimed is:
1. A multilayer ceramic condenser comprising:
a multilayer main body having a plurality of dielectric layers stacked therein and including a first side, a second side, a third side, and a fourth side;
a first outer electrode and a second outer electrode respectively formed on the first side and the third side opposing each other on the multilayer main body;
a first inner electrode pattern and a second inner electrode pattern formed within the multilayer main body so as to be exposed to the first side and the third side and to cover the dielectric layers at a predetermined interval from the third side and the first side, respectively; and a second dummy pattern and a first dummy pattern formed between the third side and the first inner electrode pattern and between the first side and the second inner electrode pattern, respectively, wherein a distance between the first inner electrode pattern and the second dummy pattern or between the second inner electrode pattern and the first dummy pattern is 70 μm or less.

2. The multilayer ceramic condenser of claim 1, wherein a distance between the first inner electrode pattern and the third side or between the second inner electrode pattern and the first side is 150 μm or less.

3. The multilayer ceramic condenser of claim 1, further comprising a first side part and a second side part formed by applying the ceramic slurry to the second side and the fourth side opposing each other on the multilayer main body, respectively.

4. The multilayer ceramic condenser of claim 1, wherein the following Formula 2 is satisfied, where a height of the multilayer main body is h1 and a height of a portion in which steps are formed due to the first and second inner electrode patterns formed in the multilayer main body is h2:

$$(h1-h2)/h1 \leq 0.1 \quad \text{Formula 2.}$$

* * * * *